Oct. 15, 1968     C. H. CANNING     3,406,017
LEAK DETECTING METHODS AND APPARATUS
Filed Aug. 7, 1964
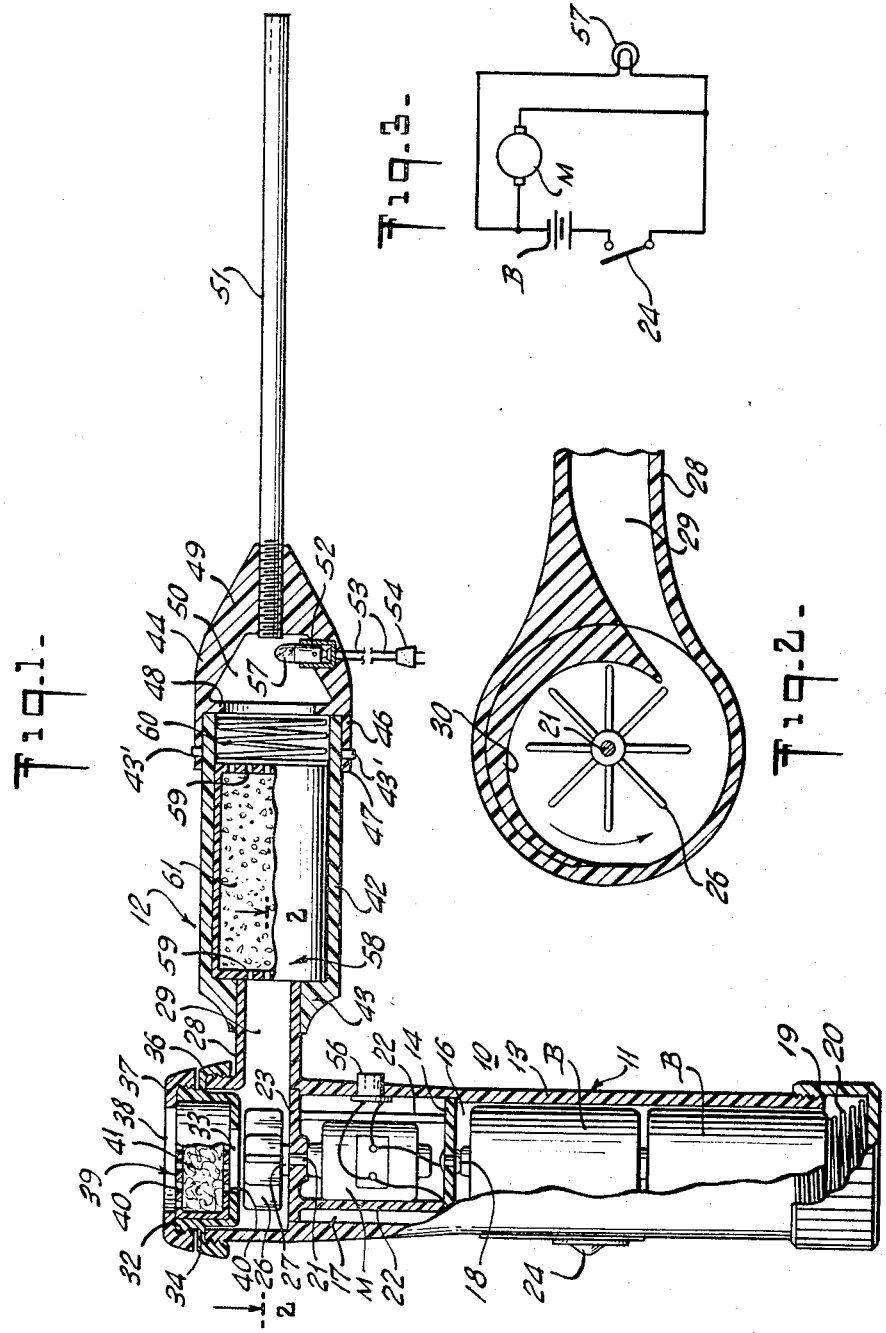
INVENTOR
CHESTER H. CANNING
BY *Stanley Wolder*
ATTORNEY

United States Patent Office 3,406,017
Patented Oct. 15, 1968

3,406,017
LEAK DETECTING METHODS AND APPARATUS
Chester H. Canning, New York, N.Y., assignor to American Gas & Chemicals, Inc., New York, N.Y., a corporation of New York
Filed Aug. 7, 1964, Ser. No. 388,238
17 Claims. (Cl. 23—232)

ABSTRACT OF THE DISCLOSURE

A leak detecting device includes a tubular nozzle formed of a light conducting material and a lamp positioned adjacent the inner end of the nozzle. The nozzle is connected to the outlet of a magazine chamber the inlet to which is connected to a motor driven blower provided with a filter. A cartridge is housed in the magazine and includes an inert material carrying a reagent vapor or gas. In use the lighted nozzle is directed toward a suspected area and the reagent gas blown into the area to react with the leaking gas to form a fine suspension rendered highly visible by the light directed thereto by the nozzle.

---

The present invention relates generally to improvements in leak detecting methods and apparatus and it relates more particularly to an improved method and device for locating gaseous leaks.

A major problem in the operation, maintenance, repair and servicing of various types of equipment in which gasses, vapors and highly volatile fluids are involved, either as starting, intermediate or end products, or as media in the process involved, is the maintenance of gas tight conditions throughout the equipment. This problem is of particular importance in many of the chemical industrial processes which are extremely complex in nature and involves the handling, treatment and transportation of various gases and highly volatile liquids, many of which are highly noxious and toxic even in very low concentration and others of which are highly corrosive and often inflammable and explosive. Furthermore, these gases and volatile liquids are frequently subjected to intensive and drastic process conditions, such as high temperatures and pressures. As a consequence, any gas or vapor leakage from such equipment not only adversely affects the operation thereof but also represents an important health and safety hazard and a source of equipment deterioration. It is thus essential in the maintenance of this equipment to monitor any gas or vapor leakage therefrom and to rapidly and precisely locate the source of such leak and repair of the same. While various devices are available for detecting the presence of a specific gas or vapor, these devices possess numerous drawbacks and disadvantages when employed to pinpoint the source or leak of such gas, particularly when such leak is very small and where turbulent or windy ambient conditions prevail. These devices are usually bulky and complicated devices frequently at low sensitivity, they lack resolution, are slow in the determination of gas concentration differences, particularly in small areas, and otherwise leave much to be desired.

It is thus a principal object of the present invention to provide an improved method and apparatus for detecting the presence of a predetermined gas.

Another object of the present invention is to provide an improved method and apparatus for exploring the relative concentrations of a predetermined gas at different points in a given area.

Still another object of the present invention is to provide an improved method and apparatus for precisely locating a leak of a gas or vapor from equipment handling such gas or vapor.

A further object of the present invention is to provide a rugged and compact gas leak locating device.

Still a further object of the present invention is to provide a method and apparatus of the above nature characterized by their low cost, versatility, simplicity, high resolution, and minimum skill requirements.

The above and other objects of the present invention will become apparent from a reading of the following description taken in conjunction with the accompanying drawing, wherein:

FIGURE 1 is a front partially sectional view of a leak locating device embodying the present invention;

FIGURE 2 is an enlarged sectional view taken along line 2—2 in FIGURE 1; and

FIGURE 3 is a schematic drawing of the electrical network of the subject device.

In a sense, the present invention contemplates the provision of a device for locating a leak of a predetermined material in a gaseous state comprising an elongated nozzle or tubular probe member terminating in an outlet opening, a source of a gaseous reagent adapted to visibly react with said predetermined gaseous material and communicating with said nozzle member, and means for blowing a gas through said nozzle and for drawing said reagent gas therewith to direct a stream containing said reagent gas from said nozzle outlet. The improved leak locating method which may be practiced to great advantage with this device comprises concurrently directing a flow of the reagent gas and a light beam toward a limited area in the vicinity of the gas leak. The reagent gas stream and light beam scan successive areas of greater leaking gas concentrations as evidenced by increasing visible reactions until a maximum is reached as indicating the location of the leak.

According to a preferred form of the present apparatus, there is provided a tubular magazine having opposite inlet and outlet openings, and a replaceable cartridge nests in the magazine and has opposite openings registering with the magazine openings. The cartridge contains a porous particulate material which carries the reagent gas in a liquid form, either as a solution or in a pure liquid state, and is closed at opposite ends by perforated plates. The magazine outlet opening is covered by a separable conical cap and the nozzle is an elongated tube which axially slidably engages an opening in the apex of the cap. An electric light bulb is located in the cap adjacent the inner end of the nozzle. A battery housing handle member has an electric motor driven blower mounted thereon and together with the electric bulb is connected by way of a switch to the batteries. The magazine is mounted on the handle and its inlet is connected to the blower outlet. Filter elements are disposed along the path of the propellant air, at the inlet to the blower and, if desired, at the magazine inlet and outlet openings.

Referring now to the drawing which illustrates a preferred embodiment of the present invention, the reference numeral 10, generally designates the improved leak locating device which comprises a hollow handle section of a nature of a flashlight casing and housing a motor driven blower and a set of batteries, and a reagent magazine and probe section 12.

The handle section 11 includes an elongated tubular barrel 13 preferably formed of an insulating material and externally threaded at opposite ends thereof. Extending across the barrel 13 between the ends thereof and resting on a shoulder on the inner face of the barrel 13 is a traverse partition 14 of an insulating material which divides the barrel into a lower battery compartment 16 and an upper blower compartment 17. A contact defining metal rivet 18 is centrally disposed on and affixed to the partition 14. A pair of end to end flashlight batteries B is replaceably housed in the lower compartment 16, the positive terminal of the upper battery B engaging the rivet contact 18. The compartment 16 is closed by a screw cap 19 which releasably engages the threaded lower end of the barrel 13 and a helical spiral compression spring 20 is entrapped between the end wall of the screw cap 19 and the bottom face of the lower battery B which defines the negative terminal thereof.

A permanent magnet direct current electric motor M is housed and mounted in the compartment 17 and is provided with an upwardly directed drive shaft 21 substantially coaxial with the barrel 13. The motor M is suitably supported by a bracket assembly including a pair of transversely spaced vertical bracket plates 22 depending from an upper end plate 23 to the partition plate 14. The end plate 23 rests on and tightly engages a shoulder formed on the inner face of the barrel 13 and has a central opening formed therein through which the motor drive shaft 21 projects. One terminal of the motor M is connected to the contact element 18 and the other terminal thereof is connected through the conventional barrel carried switch 24 to a contact element electrically engaging the negative terminal of the lower battery B.

Affixed to the drive shaft 21 and rotatable therewith is a multivane blower impeller 26 of suitable construction disposed directly above the end plate 23 and separated therefrom by a spacer washer 27. A radially directed outlet pipe 28 is integrally formed with the upper part of the barrel 13 and is provided with a passageway 29 which tangentially communicates with the interior of the barrel 13 above the end plate 23. The inner face 30 of the barrel 13 surrounding the impeller 26 is spaced from the impeller vanes and is advantageously of volute configuration expanding to the passageway 29 in the conventional manner.

Nesting in the upper end of the barrel 13 is a cup shaped receptacle 32 having a bottom end wall disposed a short distance above the impeller 26 and having a large central opening 33 formed therein. A peripheral flange 34 is directed outwardly from the wall of the receptacle 32 below the top thereof and rests on the upper edge of the barrel 13, the externally threaded upper wall of the barrel 13 being engaged by an internally threaded skirt wall 36 depending from the outer periphery of the flange 34. Th upper peripheral wall of the receptacle 32 is externally threaded and is engaged by a threaded cap member 37 provided with a large central aperture 38. Housed in the receptacle 32 and replaceably secured therein by the cap member 37 is a filter cartridge 39 including a cylindrical housing having perforated end walls 40 registering with the apertures 33 and 38 and containing any suitable highly porous gas filtering material 41 such as glass wool or the like.

A tubular cylindrical magazine 42 is coaxial with and mounted on the outlet pipe 28 and has an inner relatively heavy end wall 43, provided with a longitudinal axial bore engaging the pipe 28 to afford communication between the blower and magazine 42. The outer end of the magazine 42 is open and a pair of diametrically opposite coupling pins 43' are directed outwardly from the magazine wall shortly rearwardly of its open end. A coupling cap 44 closes the end of the magazine 42 and includes a rearwardly directed peripheral wall 46 having opposite bayonet slots 47 formed therein which engage the pins 43' to releasably lock the cap 44 to the magazine 42. An inwardly directed peripheral flange 48 is disposed along the forward edge of the cap wall 46 and rests on and projects inwardly of the front edge of magazine 42.

The leading end 49 of the cap 44 is conically shaped to a front apex and has a tapped axial bore formed therein communicating with an enlarged funnel shaped cavity 50 disposed in the cap 44 and communicating with the interior of the magazine 42. An elongated nozzle defining tubular probe 51 has a threaded trailing end which engages the tapped bore formed in the cap section 49. The tubular probe 51 is formed of a good light transmitting material, such as Lucite (polymethyl methacrylate), or the like and communicates with the cavity 50 and is longitudinally adjustable in the cap section 49 by twisting the probe 51 relative to the cap 44.

Located in the cap cavity 50 and mounted on a wall thereof is a suitable bulb socket member 52 which is connected by way of a two conductor cable 53 to a plug member 54. The plug member, in turn, releasably engages a mating socket member 56 mounted on the barrel 13 and having a pair of terminal elements connected to the terminals of the motor M. A bulb 57 releasably engages the socket 52 and is in axial alignment with the probe 51 whereby upon energization of the motor M with the closing of switch 24 the bulb 57 is concurrently energized to direct a beam of light along the probe 51 through the light conducting wall thereof which light beam emerges from the leading end of the probe 51. The probe 51 cooperates with the bulb 57 to define a valve whose opening is adjusted by advancing and retracting the trailing end of the probe 51 from the confronting bulb 57 by correspondingly twisting the probe 51. Thus the rate of gas flow through the probe 51 may thereby be readily controlled.

Housed and nesting in the magazine 42 is a replaceable cartridge 58 comprising a cylindrical casing having perforated opposite end walls 59, the rear end wall 59 abutting the inner rear face of the magazine 42 and registering with the outlet pipe 28 and the front end wall 59 confronting and disposed rearwardly of the front end of the magazine 42. A helical compression spring 60 is entrapped between the border of the front end wall 59 and the shoulder 48 to firmly position the replaceable cartridge 58 in the magazine 42.

The cartridge contains a charge 61 of a material which will release a reagent gas or vapor to a flow of air or other relatively inert gas therethrough. The charge 61 advantageously includes a porous inert solid carrier, preferably in a particulate or granular form of a size exceeding that of the perforations in the cartridge end walls 59 and the reagent gas or vapor, advantageously in a liquid state or in solution in a liquid vehicle is releasably absorbed by the carrier. The granular carrier should be inert to the reagent gas, and is advantageously highly porous and of low density and preferably of a particle size between $\frac{1}{12}$ and $\frac{1}{4}$ inch. While pumice stone is preferred, other carriers may be employed, for example, silica gel, charcoal granules, expanded mica, and the like.

In exploring and locating leaks of acid gases, for example, nitrogen dioxide or tetroxide, nitric acid and fuming nitric acid vapors, sulfur dioxide, chlorine, hydrogen chloride, hydrogen fluoride, carbon dioxide and the like, a basic type reagent gas is advantageously employed. Examples of such gases and the state in which they are carried are aqueous solutions, preferably initially concentrated although lesser concentrations may be employed, of ammonia, dimethylamine, trimethylamine, or diethylamine, or aniline or diethylamine in a pure liqud state. In exploring and locating leaks of basic gases or vapors, for example ammonia, hydrazine, dimethylhydrazine and various volatile amines, acid type reagent gases are advantageously employed. Examples of these reagent gases and their forms are aqueous solutions of hydrogen chloride, acetic acid, propionic acid or formic acid, or acetic or propionic acid in their pure liquid form.

Considering now the operation of the leak locating device 10 described above and its application in the practice of the present improved method, a cartridge 58 containing a charge of a reagent gas suitably reactive with the leak gas, as above set forth, is inserted in the magazine 42 which is then closed by the cap 44 with the spring 60 intervening, and the plug 54 is inserted in the socket 56. The switch 24 is then closed to energize the motor M and drive the impeller 26 and energize the bulb 57. The rotating impeller 26 draws air through the filter cartridge 40 which removes any entrained material and blows the cleaned air through the pipe 28 and the reagent gas cartridge 58.

The air flowing through the cartridge 58 draws or picks up reagent gas from the carrier in the cartridge 58 and the reagent gas carrying air flows through the cavity 50 and through the probe 51 out of the outlet end thereof in the form of a relatively sharply restricted or confined stream. The velocity of the reagent gas carrying gas stream leaving the probe 51 is adjusted in accordance with the ambient and test conditions by twisting the probe 51 and adjusting the opening thereto as effected by the bulb 57, as earlier set forth. The light from the bulb 57 is transmitted by the wall of the probe 51 to the outlet thereof so that a localized area of high light intensity is produced in the immediate and proximate vicinity of the emergence of the reagent gas carrying air from the probe outlet. The area of high illumination and high reagent gas concentration coincide and are concurrently moved by the manipulation of the device 10 to thereby greatly facilitate the exploration procedure.

The device 10 is moved to scan the area of the suspected leak and when the probe 51 is directed into an atmosphere containing the leaking gas the reagent gas reacts therewith to produce a visible change in the area of the probe which visible change is greatly intensified by reason of the coinciding light beam transmitted by the probe so that even extremely small physical changes in the test area become readily visible. The reaction between the reagent gas and the test gas is such as to produce a finely divided precipitate which is suspended in the area of the probe to form a smoke or the like, the light beam from the probe being scattered by such precipitate to provide easily visible evidence thereof even in small concentrations. A visible indication is provided by gas leaks of the order $1 \times 10^{-5}$ standard CCS per second or less. The area of the leak is explored by moving the probe 51 and shifting it in the direction of greater concentrations of the leaking gas as indicated by the greater intensity of the scattered light consequent to a greater concentration of the reaction precipitate. The source of the leak will generally be found in the immediate area of the greatest concentration of the leaking gas as above indicated. Any of the leak gas which is introduced into the cartridge 58 by way of the blower is precipitated in and held by the cartridge and does not flow through the probe 51. If desired, any suitable replaceable filter may be disposed between the cartridge 58 and the proble 51.

Upon depletion of the reagent gas in the cartridge 58, the cartridge 58 may be replaced with a fresh cartridge merely by removing the cap 44 to provide access to the magazine 42. Furthermore, where the device 10 is employed for different leak gases, the cartridge 58 may be replaced with other cartridges charged with suitable reagent gases and the various cartridges may be suitably identified as to their charge.

While there have been described and illustrated preferred embodiments of the present invention numerous alterations, omissions and additions may be made without departing from the spirit thereof. For example, whereas the gas flow is effected by means of a motor driven impeller other suitable gas flow producing devices may be employed. Moreover, it should be noted that where the term gas is employed it is used in its broad sense and is intended to include vapors and the like.

What is claimed is:

1. A device for locating a leak of a predetermined material in a gaseous state comprising a magazine having an inlet opening and an outlet opening, an outlet nozzle connected to said magazine outlet opening, a source of pressurized gas connected to said magazine inlet opening, and a source of a gaseous reagent adapted to visibly react with said predetermined gaseous material and disposed in said magazine.

2. A device for locating a leak of a predetermined material in a gaseous state comprising a magazine having an inlet opening and an outlet opening, an outlet nozzle connected to said magazine outlet opening, a source of pressurized gas connected to said magazine inlet opening, and a replaceable cartridge disposed in said magazine and containing a source of a gaseous reagent adapted to visibly react with said predetermined gaseous material and disposed in said magazine.

3. A device for locating a leak of a predetermined material in a gaseous state comprising a magazine having opposite inlet and outlet openings, an outlet nozzle connected to said magazine outlet opening, a source of pressurized gas connected to said magazine inlet opening, and a replaceable cartridge disposed in said magazine and including a casing having opposite openings registering with said magazine inlet and outlet openings and containing a solid porous carrier supporting a source of a gaseous reagent adapted to visibly react with said predetermined gaseous material.

4. A device for locating a leak of a predetermined material in a gaseous state comprising an elongated nozzle member formed of a light transmitting material and having opposite inlet and outlet openings, a light source disposed adjacent to the inlet end of said nozzle member, a source of a gaseous reagent adapted to visibly react with said predetermined gaseous material and communicating with said nozzle member, and means for blowing a gas through said nozzle and for drawing said reagent gas therewith to direct a stream containing said reagent gas from said nozzle outlet.

5. A device for locating a leak of a predetermined material in a gaseous state comprising a magazine having opposite inlet and outlet openings, an elongated outlet nozzle connected to said magazine outlet opening, a blower device having an outlet connected to said magazine inlet opening, and a replaceable cartridge disposed in said magazine and including a casing having opposite openings registering with said magazine inlet and outlet openings and containing a solid porous carrier supporting a source of a gaseous reagent adapted to visibly react with said predetermined gaseous material.

6. The leak locating device of claim 5 including perforated plates disposed at opposite ends of said cartridge in registry with the said openings therein.

7. The leak locating device of claim 5 including means for controlling the rate of gas flow through said cartridge and nozzle.

8. The leak locating device of claim 5 wherein said blower device comprises an electric motor driven impeller and including a battery housing handle member supporting said blower device, and means including a switch connecting said motor to said battery, said magazine and nozzle being mounted on said handle.

9. The leak locating device of claim 5 including a gas pervious filter element disposed at the inlet of said blower device.

10. The leak locating device of claim 5 wherein said carrier is a particulate liquid absorbent material unreactive with said reagent gas.

11. The leak locating device of claim 5 wherein said source of reagent gas is in a liquid state.

12. The leak locating device of claim 5 wherein said magazine comprises a tubular casing having one end connected to said blower and a removable cap closing the other end thereof and having said magazine outlet opening formed therein.

13. The leak locating device of claim 12 wherein said cap is provided with a conical end wall terminating in said magazine outlet opening and said nozzle is formed of a light transmitting material and axially adjustably engages said outlet opening, and including an electric light bulb disposed within said cap adjacent to the inner end of said nozzle.

14. The method of locating a leak of a predetermined gas comprising directing a flow of a gaseous reagent adapted to visibly react with said predetermined gas toward a limited area in the vicinity of said leak and concurrently directing a beam of light toward said restricted area.

15. The method of locating a leak of a predetermined gas comprising directing a flow of a gaseous reagent adapted to visibly react with said predetermined gas toward a limited area in the vicinity of said leak and concurrently concentrating a beam of light in said restricted area.

16. The method of locating a leak of a predetermined gas comprising concurrently scanning the vicinity of said gas leak with a stream of a gaseous reagent adapted to visibly react with said predetermined gas and directed to a restricted area and with a concentrated light beam directed at said restricted area.

17. The method of claim 16 comprising moving said gas stream and light beam in the direction of increasing visible reaction.

References Cited
UNITED STATES PATENTS

| | | | |
|---|---|---|---|
| 2,907,639 | 10/1959 | Paumier et al. | 23—254 |
| 3,311,455 | 3/1967 | Robinson | 23—255 |

MORRIS O. WOLK, *Primary Examiner.*

R. M. REESE, *Assistant Examiner.*